US009097163B2

(12) United States Patent
George et al.

(10) Patent No.: US 9,097,163 B2
(45) Date of Patent: Aug. 4, 2015

(54) METHOD, APPARATUS, AND SYSTEM TO CONTROL SELECTIVE CATALYTIC REDUCTION (SCR) CATALYST AMMONIA SLIP DURING HIGH TEMPERATURE TRANSITIONS

(71) Applicant: Corning Incorporated, Corning, NY (US)

(72) Inventors: Sam George, Painted Post, NY (US); Achim Karl-Erich Heibel, Corning, NY (US)

(73) Assignee: Corning Incorporated, Corning, NY (US)

(*) Notice: Subject to any disclaimer, the term of this patent is extended or adjusted under 35 U.S.C. 154(b) by 54 days.

(21) Appl. No.: 13/837,492

(22) Filed: Mar. 15, 2013

(65) Prior Publication Data
US 2014/0150409 A1  Jun. 5, 2014

Related U.S. Application Data

(60) Provisional application No. 61/731,546, filed on Nov. 30, 2012.

(51) Int. Cl.
*F01N 3/00* (2006.01)
*F01N 3/02* (2006.01)
(Continued)

(52) U.S. Cl.
CPC ...... *F01N 3/208* (2013.01); *F01N 9/00* (2013.01); *F01N 2430/00* (2013.01); *F01N 2610/02* (2013.01); *F01N 2900/08* (2013.01);
(Continued)

(58) Field of Classification Search
USPC .................. 60/274, 277, 286, 295, 299, 301
See application file for complete search history.

(56) References Cited

U.S. PATENT DOCUMENTS

| 8,109,081 B2* | 2/2012 | Perry et al. ............. 60/286 |
| 8,112,986 B2* | 2/2012 | Kurtz ................... 60/285 |

(Continued)

FOREIGN PATENT DOCUMENTS

| WO | 2011/118095 | 9/2011 |
| WO | 2011/139967 | 11/2011 |

(Continued)

OTHER PUBLICATIONS

WO2011/118095—machine translation.
(Continued)

*Primary Examiner* — Audrey K Bradley
*Assistant Examiner* — Dapinder Singh
(74) *Attorney, Agent, or Firm* — Charles A. Greene (57) ABSTRACT

Method, apparatus, and system to control ammonia slip in a selective catalytic reduction (SCR) system. The method includes detecting an engine operation transition event, increasing NOx to the SCR catalyst, and decreasing a reductant dose. The system includes a controller to receive an engine transition signal, anticipate a temperature transition at the SCR catalyst in response to the engine transition signal, and cause a NOx increase in the exhaust gas stream to the SCR catalyst and a decrease of reductant to the SCR catalyst coinciding with the temperature transition at the SCR catalyst. The apparatus includes a NOx increase module to cause the NOx increase in the exhaust gas stream to the SCR catalyst in response to the engine transition signal. The apparatus also includes a reductant shut-off module configured to cause the reductant addition to the exhaust gas stream to turn off in response to the engine transition signal.

20 Claims, 6 Drawing Sheets

(51) Int. Cl.
*F01N 3/10* (2006.01)
*F01N 3/20* (2006.01)
*F01N 9/00* (2006.01)

(52) U.S. Cl.
CPC . *F01N2900/1616* (2013.01); *F01N 2900/1812* (2013.01); *Y02T 10/24* (2013.01); *Y02T 10/47* (2013.01)

(56) References Cited

U.S. PATENT DOCUMENTS

| | | | |
|---|---|---|---|
| 8,117,833 B2 * | 2/2012 | Sakimoto et al. | 60/295 |
| 8,161,730 B2 | 4/2012 | Chi et al. | 60/286 |
| 8,181,451 B2 * | 5/2012 | VanderVeen et al. | 60/295 |
| 2010/0058740 A1 * | 3/2010 | Kurtz | 60/286 |
| 2011/0262329 A1 | 10/2011 | Ofoli et al. | 423/213.2 |

FOREIGN PATENT DOCUMENTS

| | | |
|---|---|---|
| WO | 2011139631 | 11/2011 |
| WO | 2012/038807 | 3/2012 |

OTHER PUBLICATIONS

Majewski, A.W., Selective Catalytic Reduction, Dieselnet Technology Guide, www.dieselnet.com, 2013.

Cho, S.M., 1994. "Properly Apply Selective Catalytic Reduction for NOx Removal", Chem. Eng. Prog., Jan. 1994, 39-45, Book.

Cooper, B.J., A.C. McDonnald, A.P. Walker, M. Sanchez, 2003. "The Development and On-Road Performance and Durability of the Four-Way Emission Control SCRT System", US DOE, 9th Diesel Engine Emissions Reduction Conference (DEER), Newport, RI, Aug. 2003.

* cited by examiner

METHOD, APPARATUS, AND SYSTEM TO CONTROL SELECTIVE CATALYTIC REDUCTION (SCR) CATALYST AMMONIA SLIP DURING HIGH TEMPERATURE TRANSITIONS

CROSS-REFERENCE TO RELATED APPLICATIONS

This application claims the benefit of priority under 35 U.S.C. §119 of U.S. Provisional Application Ser. No. 61/731,546 filed on Nov. 30, 2012, the content of which is relied upon and incorporated herein by reference in its entirety.

BACKGROUND

1. Field

Exemplary embodiments of the present disclosure relate to methods, systems, and apparatus to control ammonia slip in a selective catalytic reduction (SCR) system.

2. Discussion of the Background

Selective Catalytic Reduction (SCR) technology is one of the most common NOx reduction technologies in use today for internal combustion engines such as on-road heavy-duty as well as light-duty diesel engine applications around the world, for example, in the U.S. and Europe. A primary reagent used in SCR systems is urea. One form of urea used in SCR systems is referred to as Diesel Exhaust Fluid (DEF) in the U.S. and AU32 or ADBLUE™ in Europe, both of which are a 32.5% aqueous solution of urea in water. The injected urea decomposes in the presence of heat and moisture to form ammonia and carbon dioxide. The ammonia then reacts with NOx in the presence of the SCR catalyst to reduce NOx to nitrogen and water. The optimal operation of the SCR system may depend on an efficient control strategy which helps to minimize the overall NOx emissions with minimal ammonia slip Ammonia slip refers to the passage of unreacted ammonia emissions out of the SCR system. An ammonia oxidation (AMOX) catalyst downstream of the SCR catalyst may be needed to convert most of the ammonia slipping past the SCR catalyst to $N_2$ and other less harmful compounds to avoid ammonia emissions from the tailpipe.

Ammonia slip is an unwanted by-product of the SCR catalytic reaction and is desired to be kept at a minimum Ammonia is a regulated emission in Europe; the average ammonia slip over the certification cycle is required to be less than 10 ppm for on-road and less than 25 ppm for non-road, and it is expected to be regulated in the US as well in the near future. Most SCR catalysts adsorb ammonia at low temperature conditions (less than about 300° C.) which may then be used for NOx reduction in the presence of the SCR catalyst. Ammonia can be desorbed when the SCR catalyst substrate is exposed to high temperature (greater than about 350 to about 400° C.) and this may result in momentary ammonia spikes. The momentary ammonia spikes not only result in increased ammonia slip but also result in unused (wasted) ammonia. It is therefore desired to have methods to avoid such ammonia slip both from a regulatory perspective and also from an SCR system operation efficiency standpoint.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present disclosure provide a method to control ammonia slip in a selective catalytic reduction (SCR) system.

Exemplary embodiments of the present disclosure also provide an apparatus to control a selective catalytic reduction (SCR) system of an internal combustion engine.

Exemplary embodiments of the present disclosure also provide a system to control ammonia slip in a selective catalytic reduction (SCR) catalyst.

Additional features of the claimed invention will be set forth in the description which follows, and in part will be apparent from the description, or may be learned by practice of the claimed invention.

An exemplary embodiment discloses a method to control ammonia slip in a selective catalytic reduction (SCR) system. The method includes detecting an engine operation transition event, increasing NOx concentration in an engine exhaust gas stream, and decreasing a reductant dose to the exhaust gas stream.

An exemplary embodiment also discloses an apparatus configured to control a selective catalytic reduction (SCR) system of an internal combustion engine system. The apparatus includes a NOx increase module configured to cause a NOx concentration increase in an engine exhaust gas stream in response to an engine operation transition signal. The apparatus also includes a reductant control module configured to cause a reductant addition decrease in the engine exhaust gas stream in response to the engine operation transition signal.

An exemplary embodiment also discloses a selective catalytic reduction (SCR) system of an internal combustion engine. The system includes an internal combustion engine configured to produce an exhaust gas stream; a selective catalytic reduction (SCR) catalyst to receive the exhaust gas stream and reduce NOx emissions in the exhaust stream in the presence of a reductant, a transition sensor module configured to detect an engine operation transition event and to generate an engine operation transition signal in response to the detection. The system includes an SCR system controller configured to receive the engine operation transition signal, and cause a NOx increase in the exhaust gas stream and a decrease of reductant addition to the SCR catalyst in response to the engine operation transition signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the claimed invention and are incorporated in and constitute a part of this specification, illustrate exemplary embodiments of the disclosure, and together with the description serve to explain the principles of the claimed invention.

DETAILED DESCRIPTION OF THE ILLUSTRATED EMBODIMENTS

The disclosure is described more fully hereinafter with reference to the accompanying drawings, in which exemplary embodiments are shown. The claims may, however, be embodied in many different forms and should not be construed as limited to the embodiments set forth herein. Rather, these embodiments are provided so that this disclosure is thorough, and will fully convey the scope of the claims to those skilled in the art. In the drawings, the size and relative sizes of layers and regions may be exaggerated for clarity. Like reference numerals in the drawings denote like elements.

It will be understood that when an element is referred to as being "on" or "connected to" another element, it can be directly on or directly connected to the other element, or intervening elements may be present. In contrast, when an element is referred to as being "directly on" or "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
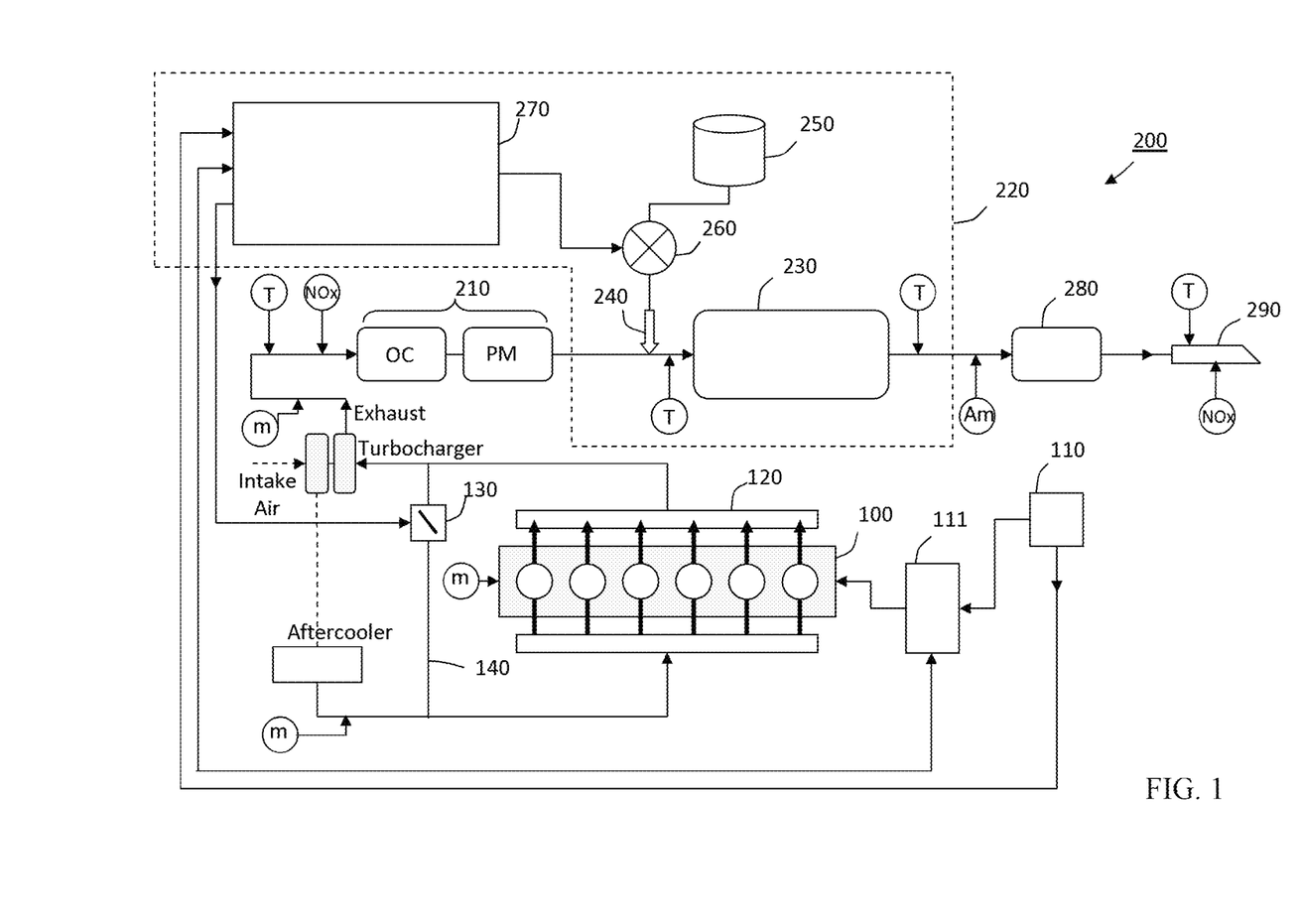
FIG. 1 is a schematic block diagram of an internal combustion engine having a selective catalytic reduction (SCR) system according to an exemplary embodiment of the disclosure.

FIG. 1 is a schematic block diagram of an internal combustion engine having a selective catalytic reduction (SCR) system according to an exemplary embodiment of the disclosure. The internal combustion engine 100 may be a diesel engine, a gasoline engine, or the like, that emits an exhaust gas stream. An input control device 110 may input control signals to the internal combustion engine 100 to control an operation of the internal combustion engine 100. The input control device 110 may detect a pedal movement and translate the pedal movement to an Engine Control Unit (ECU) 111. The ECU 111 may then control the internal combustion engine 100 in response to the pedal movement. The ECU 111 may control the internal combustion engine 100 with a closed-loop control or an open-loop control based on a lookup table or a computation in response to the pedal movement or other detected input.

The internal combustion engine 100 emits an exhaust gas stream at an exhaust gas manifold 120. An exhaust gas recirculation (EGR) valve 130 may direct a portion of the exhaust gas stream back into the internal combustion engine 100 at an inlet port 140. An exhaust gas after treatment system 200 configured to remove various chemical compounds and/or particulate matter may be coupled to the exhaust manifold 120 of the internal combustion engine 100. The exhaust gas after treatment system 200 may include an oxidation catalyst (OC) and/or particulate matter (PM) filter 210 and an SCR system 220 having an SCR catalyst 230, reductant injector 240, reductant source 250, reductant control valve 260, and a SCR catalyst controller 270. In some exemplary embodiments the SCR catalyst 230 may be a particulate matter filter that has SCR catalyst functionality. The exhaust gas after treatment system 200 may also include an ammonia oxidation (AMOX) catalyst 280. Temperature sensors "T", mass flow sensors "m", NOx sensors "NOx", and ammonia sensors "Am" may also be employed in the exhaust gas after treatment system 200 for closed-loop engine control by the ECU 111 or SCR catalyst controller 270. For example, temperature sensors "T" may be included before the OC and/or PM filter 210, before the SCR catalyst 230, after the SCR catalyst 230, and at the tailpipe 290. NOx sensors "NOx" may be included before the OC and/or PM filter 210.

The internal combustion engine 100 exhaust gas stream exits the internal combustion engine 100 into the exhaust system manifold 120. The EGR valve 130 may direct a portion of the exhaust gas stream back into the internal combustion engine 100. A portion of the exhaust gas stream passing the EGR 130 may enter the optional OC and/or PM filter 210. After passing through the OC and/or PM filter 210, the exhaust gas stream downstream of the OC and/or PM filter 210 may be treated with the reductant added to the exhaust gas stream at the reductant injector 240. The exhaust gas stream having the reductant entrained then passes through the SCR catalyst 230. The exhaust gas stream exiting the SCR catalyst 230 then passes through the optional AMOX filter 280 and out the tail pipe 290.

The SCR system 220 includes a reductant delivery system that includes the reductant source 250 and a delivery mechanism such as the reductant injector 240. The reductant source 250 can be a container or tank capable of retaining a reductant, such as, for example, ammonia ($NH_3$) or urea. The SCR system 220 supplies reductant from the reductant source 250 to the delivery mechanism (reductant injector 240) through reductant control valve 260. The reductant control valve 260 can be controlled by SCR catalyst controller 270. The SCR catalyst controller 270 may be part of the ECU 111, a module in the ECU 111, or may be a separate module. The reductant injector 240 can be positioned upstream of the SCR catalyst 230. The injector 240 is selectively controllable to deliver reductant directly into the exhaust gas stream prior to entering the SCR catalyst 230. In some exemplary embodiments, the reductant can either be ammonia or urea, which decomposes to produce ammonia. As will be described in more detail below, in these embodiments, the ammonia reacts with NOx in the presence of the SCR catalyst 230 to reduce the NOx to less harmful emissions, such as $N_2$ and $H_2O$. The SCR catalyst 230 can be any of various catalysts known in the art. For example, in some implementations, the SCR catalyst 230 is a vanadium-based catalyst, and in other implementations, the SCR catalyst 230 is a zeolite-based catalyst, such as a Cu-Zeolite or a Fe-Zeolite catalyst. In an exemplary embodiment, the reductant is aqueous urea and the SCR catalyst 230 is a zeolite-based catalyst.

The conversion efficiency of the SCR system depends on several factors, including the catalyst used, amount of NOx, the ratio of $NO:NO_2$ in the incoming NOx, temperature of the exhaust, amount of reductant (urea) injected, flow of the exhaust gas, size of the catalyst brick, amount of catalyst, and ammonia adsorption and desorption of the catalyst. Some SCR catalysts like zeolites are very efficient at adsorbing ammonia at low temperatures. This adsorbed ammonia may be used towards NOx reduction later and may be replenished again when the SCR catalyst experiences adsorption favorable conditions. The desorption of ammonia from the catalyst occurs when a transition to higher temperatures occurs in the exhaust gas stream. Desorption typically occurs at greater than 350 to 400° C. In such instances, depending on the starting and ending temperatures and the amount of ammonia that was adsorbed before the high temperature transition, there could be a desorption event that causes an ammonia spike in the exhaust gas stream that in turn results in unreacted ammonia slipping from the SCR catalyst. Ammonia is typically used up in 1:1 molar ratio with NOx. As a result, when there is an ammonia spike, in order for it to be consumed, there should be an equivalent amount of NOx in the exhaust without which the ammonia slips unreacted from the SCR catalyst. The proper operation of the SCR depends on an efficient control strategy which helps to minimize the overall NOx emissions with minimal ammonia slip. The method described and claimed herein reduces the ammonia slip in the event of an anticipated desorption by increasing the NOx concentration during the period of anticipated ammonia desorption. An increased NOx concentration in the exhaust gas stream during the period of anticipated ammonia desorption would enable most or all of the desorbed (excess) ammonia to be used to reduce the NOx to less harmful emissions, such as $N_2$ and $H_2O$. Without an increased NOx concentration in the exhaust gas stream during the period of expected ammonia desorption, the desorbed ammonia will remain unreacted and may be emitted from the tail pipe.

The desorption of ammonia from the catalyst when a transition to higher temperature occurs in the exhaust gas stream also means that the urea injection during this temperature transition phase can be decreased or stopped. The increased NOx emissions will be reacted with the available ammonia that has been desorbed. The other advantage is that any measure used to increase NOx from the engine usually translates into an advantage as far as fuel consumption is concerned Ammonia slip is an unwanted by-product of the SCR reaction and is desired to be kept at a minimum because ammonia is a regulated emission in some countries and the average ammonia slip over the certification cycle is required to be less than 10 ppm for on-road and less than 25 ppm for non-road. The present disclosure describes exemplary embodiments by which ammonia slip can be minimized by appropriate engine control and reductant injection strategies. An advantage of the method disclosed is that it reduces fuel consumption and as a result helps increase fuel economy and decrease $CO_2$ emission.

The most common SCR reactions are as follows:

(1)

(2)

(3)

(4)

(5)

Equation (2) represents the dominant SCR reaction. Equations (3) to (5) involve reactions with $NO_2$. Equation (5) is called a "Fast SCR Reaction" and involves both NO and $NO_2$. This reaction is responsible for the low temperature NOx reduction with the aid of $NO_2$.

Ammonia is typically used up in a 1:1 molar ratio with NOx (see equations (2) and (5) above). As a result, when there is an ammonia spike, in order for the ammonia to be fully reacted, there should be an equivalent amount of NOx in the exhaust without which the ammonia slips through unused (i.e., unreacted). According to an exemplary embodiment, the method of the current disclosure is to increase the NOx concentration from the engine in response to an anticipated increase in SCR catalyst inlet temperature. The increase in SCR catalyst inlet temperature is anticipated as a result of a change in engine operating conditions that is expected to increase the SCR temperature. The NOx concentration may be increased by using engine controls, for example, reducing EGR or modifying fuel injection timing to increase NOx to the desired level. The level of EGR reduction and fuel injection timing modification will depend on the expected ammonia desorption. The amount of ammonia that may be released (desorbed) can be computed from an efficient ammonia storage model which may be based on factors including (but not limited to) the surface coverage of the SCR catalyst, amount of reductant (urea) being dosed (injected) and by monitoring engine exhaust conditions, for example, mass flow, temperature, and the amount of ammonia being used. Ammonia sensors can also make the ammonia storage models more efficient in calculating the ammonia storage on an instantaneous basis.

Figure 2:
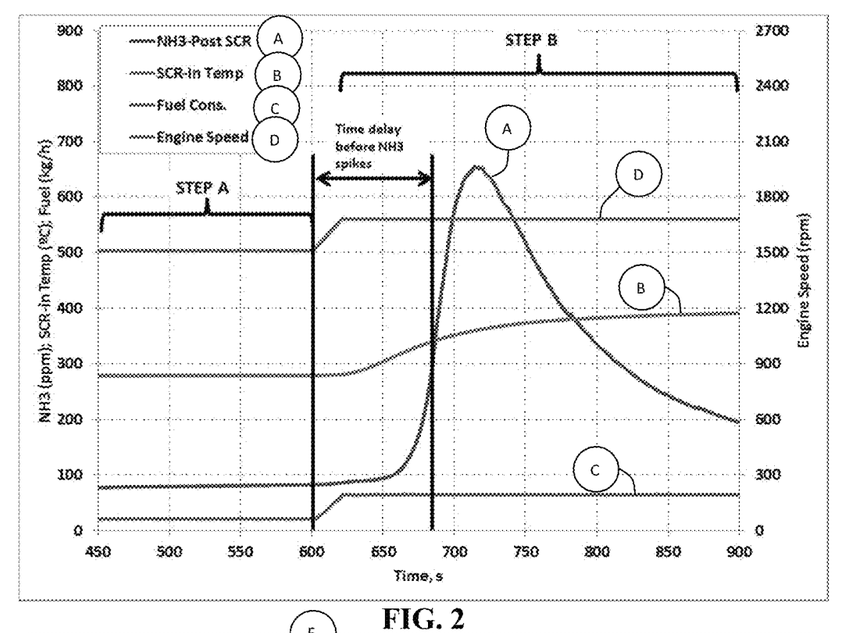
FIG. 2 is a graphical plot of data from an SCR system showing delay in temperature response and ammonia slip after engine condition transition.

FIG. 2 shows a transition in engine operation from an arbitrary low temperature Step A to an arbitrary high load/high temperature Step B. Steady-state engine operation is shown for proper clarity of the method. Exemplary embodiments of the method may also be applicable to most transient engine operations as well. Step A in the example shown in FIG. 2 is at an engine speed of 1500 rpm and the fuel being consumed for the torque/power demand is 20 kg/h which results in an exhaust temperature of about 280° C. at the SCR catalyst inlet. The ammonia slip at this condition is seen to be approximately 80 ppm, and this depends on the ammonia storage capacity of the SCR catalyst and the urea dosing strategy. The transition to Step B which is at 1700 rpm and with a fuel consumption of 65 kg/h based on an increased torque demand results in an increase in SCR inlet temperature to about 385° C. This also results in a desorption induced ammonia spike of approximately 650 ppm. The ammonia slip then subsides since most of the ammonia stored in the SCR catalyst is released with the temperature increase and then steadies to about 100 ppm based on the urea dosing strategy for that particular operating condition. It can be seen that there is a time delay of about 50-80 s from the point of change in engine speed and fueling to the point of increased temperature at the SCR catalyst inlet. This time delay is a result of the distance between the engine exhaust manifold and the SCR catalyst inlet. The other exhaust components that may be present (for example, diesel oxidation catalysts (DOC), PM filters, etc.) and the exhaust piping act as heat sinks and as a result translates into the time delay in the temperature response at the SCR catalyst inlet. The present disclosure makes use of this time delay to implement a strategy to effectively counter the desorption induced ammonia spike resulting from the transitions in engine operating conditions. Thus, little to no ammonia slip may occur as a result of engine operation transitions and resulting temperature excursions.

Figure 3:
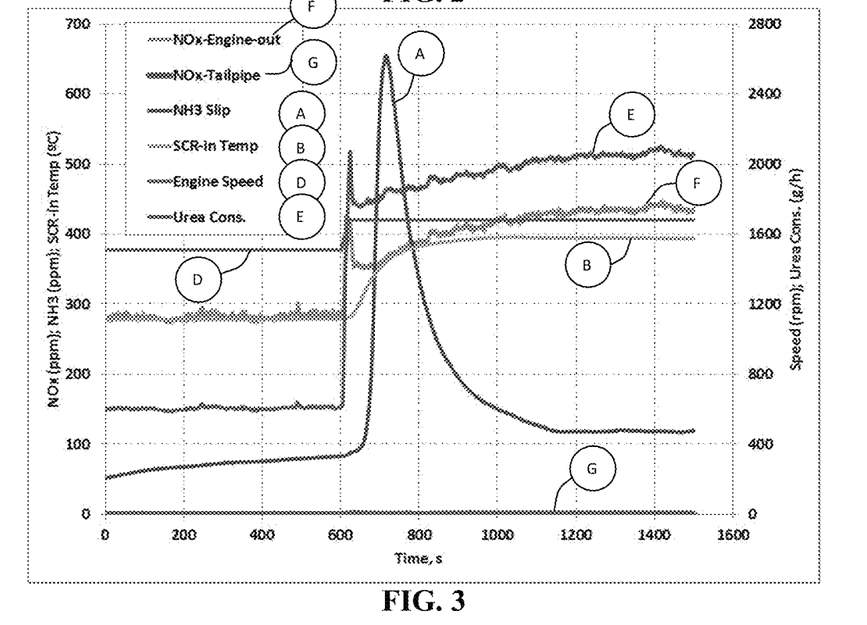
FIG. 3 is a graphical plot of data from an SCR system under normal operation showing an ammonia ($NH_3$) peak of about 650 ppm in response to step transition engine condition.
Figure 4:
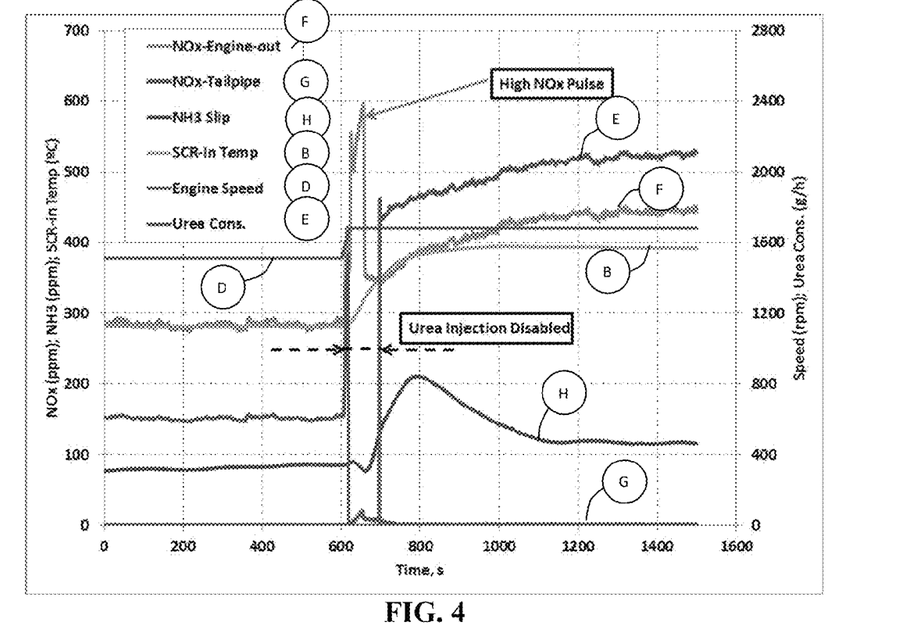
FIG. 4 is a graphical plot of data from an SCR system according to an exemplary embodiment of the disclosure showing increasing NOx and disabling urea injection for a short duration following the engine condition transition to reduce the ammonia slip.

FIG. 3 shows the events that occur during a regular operation where the engine transitions from Step A to Step B and results in an ammonia slip. FIG. 3 shows the case where the method to effectively counter the desorption induced ammonia spike is not applied. FIG. 4 shows the same engine transition from Step A to Step B, but with the implementation of an exemplary embodiment of the disclosed method of increased NOx concentration and decreased urea injection as described herein. An exemplary embodiment of this method has the following procedure. Monitoring engine operation in a continuous manner, implementing the procedure to increase NOx concentration when a transition that will result in high SCR catalyst inlet temperature is noticed, simultaneously decreasing or stopping urea dosing briefly to make use of the desorbed ammonia and prevent or decrease any ammonia spikes. The method may resume a normal urea dosing strategy for the engine conditions of Step B once the desorbed ammonia is used up from the increased NOx strategy, and revert back to normal NOx levels after the desorbed ammonia has been used up.

It can be seen from FIG. 4, that the increased NOx consumes the ammonia that would have gone wasted (unreacted) as was seen in FIG. 3. The decrease in the ammonia spike and decrease in related ammonia slip is the difference seen between FIG. 3 and FIG. 4. That is, the ammonia spike following the engine transition from Step A to Step B has decreased from about 650 ppm to about 210 ppm. It is also seen from comparing FIGS. 3 and 4, that the tailpipe NOx is not significantly affected as a result of the employed strategy (i.e., increased engine-out NOx and urea dose reduction or disabling). As the examples in FIGS. 3 and 4 demonstrate, the engine controls can be utilized more efficiently by way of which the steps for increasing NOx and decreasing or disabling the reductant (urea) dosing may be optimized to eliminate any increase at all in the tailpipe NOx. The overall NOx conversions for the duration of the operations shown in FIGS. 3 and 4 are greater than 99%.

Figure 5:
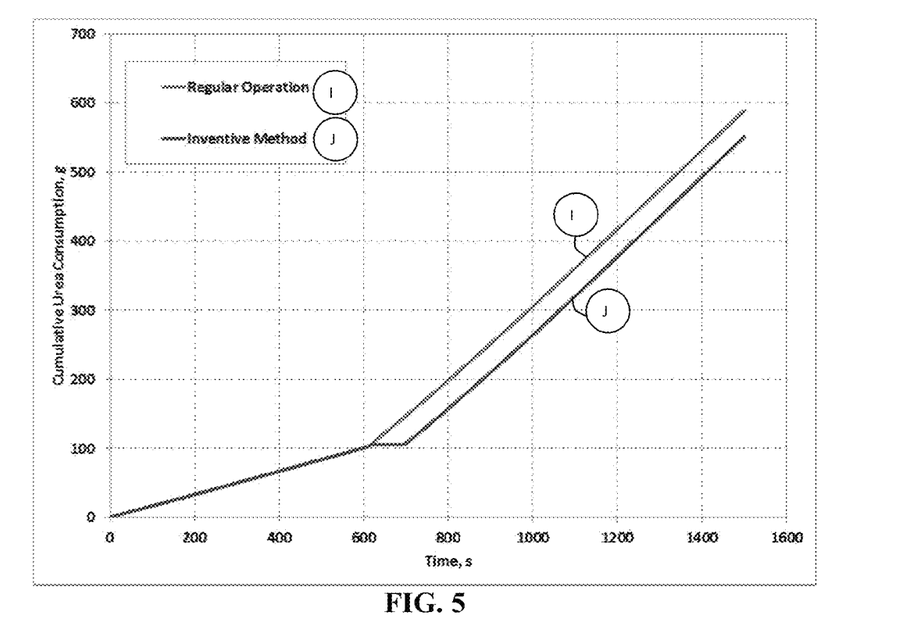
FIG. 5 is a graphical plot of data from the SCR systems shown in FIGS. 3 and 4 showing the reduction in cumulative reductant consumption according to the exemplary embodiment of the disclosure shown in FIG. 4.

FIG. 5 shows the cumulative urea consumption comparison between the two cases (normal operation, for example, as shown in FIG. 3, and operation based on exemplary embodiments of the disclosed procedure, for example, as shown in FIG. 4). It can be seen that the disclosed procedure described herein results in a decreased urea consumption as a result of decreasing or disabling the urea dosing briefly based on the high temperature transition that was anticipated. There was no differences seen for the fuel consumption between the two cases over the short duration of the example tests, but there could be an overall fuel consumption benefit over the life of an engine based on the disclosed strategy of increased NOx concentration and decreased urea injection. The urea and fuel economy benefit over the life of the vehicle/fleets as a result of the described method would be significant considering the fact that most diesel engines in US and EU depend on a SCR catalyst for NOx reduction.

Figure 6:
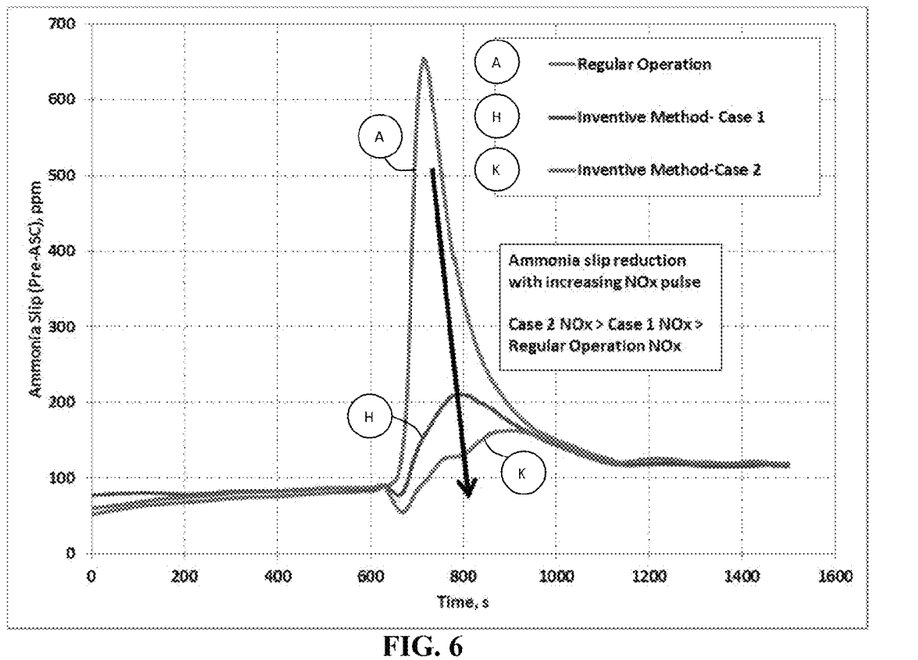
FIG. 6 is a graphical plot of data from an SCR system according to an exemplary embodiment of the disclosure showing ammonia slip reduction with increasing NOx pulses.

FIG. 6 shows the reduction in ammonia slip spike for cases of varying NOx pulses based on the exemplary embodiments of the method disclosed herein. It is seen that the magnitude of the ammonia spike and associated ammonia slip decreases with increase in the engine-out NOx concentration to the SCR catalyst (NOx pulse). The highest ammonia peak is the case where the method to effectively counter the desorption induced ammonia spike is not applied (FIG. 3). The next lower ammonia peak is the case where implementing an exemplary embodiment of the disclosed method with increased engine-out NOx concentration and decreased urea injection as shown in FIG. 4. The lowest ammonia peak is a second case implementing an exemplary embodiment of the disclosed method with increased engine-out NOx concentration and decreased urea injection as described herein, however the second case included a higher engine out NOx concentration to the SCR catalyst than the first case shown in FIG. 4. The second case with a higher NOx concentration to the SCR catalyst than the first case results in a lower ammonia spike and associated ammonia slip.

Figure 7:
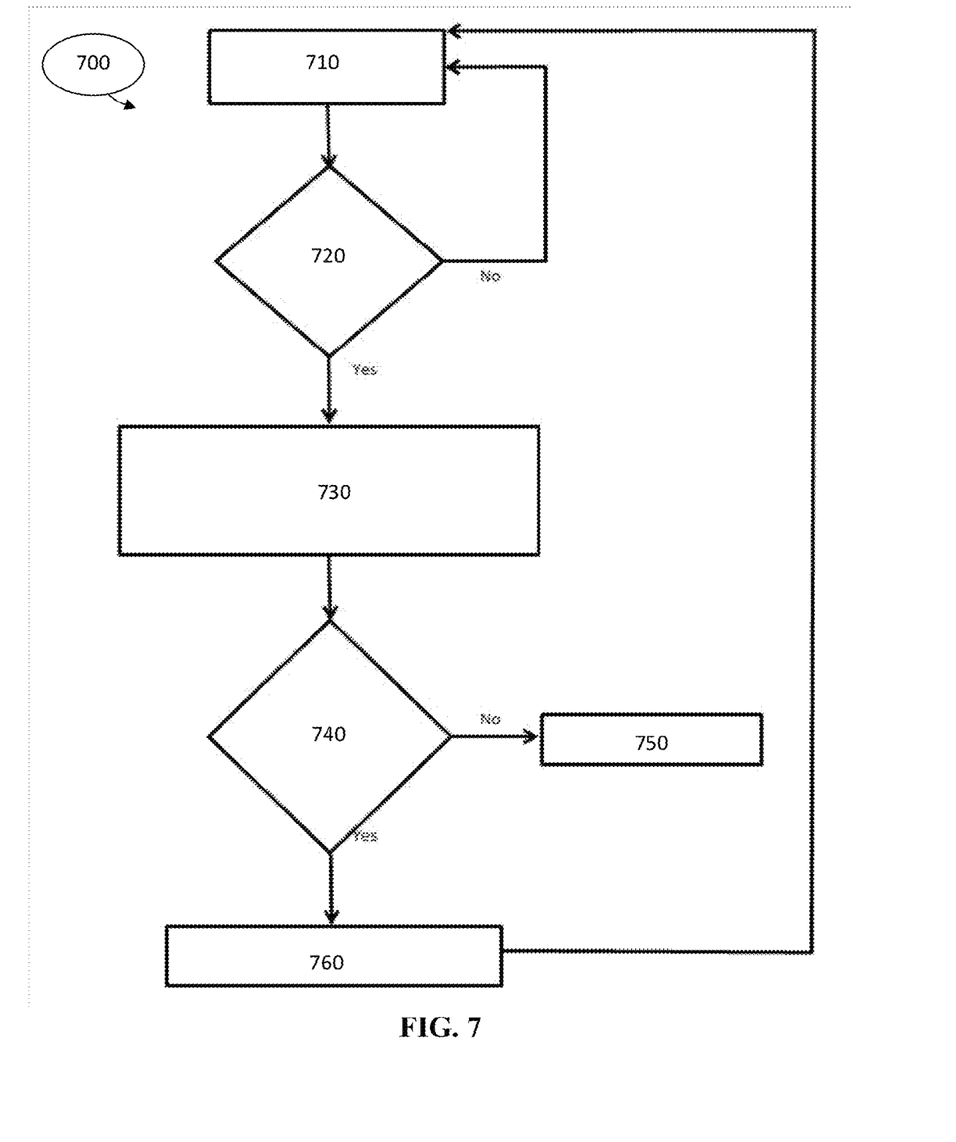
FIG. 7 is a schematic flow chart diagram of a method to control ammonia slip in an SCR system according to an exemplary embodiment of the disclosure.

FIG. 7 shows an example flow chart of an exemplary embodiment of the disclosed method 700 to decrease or eliminate ammonia slip in an SCR catalyst described above. Referring back to FIG. 1, the SCR system 220 may perform the exemplary embodiment of the disclosed method 700 to decrease or eliminate ammonia slip in the SCR catalyst 230. In operation 710 engine 100 conditions are monitored in a continuous manner. The Engine Control Unit (ECU) 111 or the SCR catalyst controller 270 may perform monitoring the engine 100 conditions such as timing, rpm, engine air intake, engine temperature, fuel flow rate, exhaust temperature, exhaust gas mass flow rate, NOx concentration in the exhaust gas stream, and the like in operation 710. In operation 720 a decision is made on whether an engine high temperature event is anticipated that will result in high temperature exhaust gas stream at the SCR catalyst 230. The engine high temperature event may be anticipated by detection of pedal movement or other operator control input via sensor 110. The engine high temperature event may be anticipated by detection of ECU 111 controlled change of engine 100 conditions. For example, the event may be anticipated by engine 100 timing advance or delay, increase or decrease in engine 100 torque, change in fuel flow to the engine 100, and the like. The high temperature event could also be anticipated by soot burn off in the case of an actively regenerated particulate filter present upstream of the SCR system or other event that would increase exhaust gas temperatures.

If decided at 720 that an engine high temperature event is not anticipated, the system returns to monitoring the engine 100 conditions. If the decision at 720 is positive, then in operation 730 the system determines a time delay from the engine transition event until the high temperature exhaust gases reach the SCR catalyst 230 to cause an ammonia release from the SCR catalyst bed. In operation 730 the system also decreases or stops the reductant (urea) dosing based on the time delay determination. The SCR catalyst controller 270 may cause the reductant control valve 260 to decrease or turn off the reductant to the reductant injector 240 or SCR catalyst controller 270 may directly control the reductant injector 240 to decrease or stop reductant delivery based on the determined time delay. In operation 730 the SCR system 220 also increases the NOx concentration in the exhaust gas stream (NOx boost or NOx pulse) based on the time delay determination and the anticipated ammonia release. The ECU 111 or the SCR catalyst controller 270 may cause the exhaust gas recirculation (EGR) valve 130 to deliver the NOx boost to the exhaust gas stream and the SCR catalyst inlet. In other exemplary embodiments, for example, in non-EGR systems, the NOx boost may be delivered by fuel delivery pressure, air pressure, back pressure adjustment, and the like. Such pressure adjustment may be controlled by the ECU 111 or the SCR catalyst controller 270. In operation 730 the system estimates the duration of the anticipated ammonia spike. For example, in FIG. 3, the duration of the ammonia spike was about 300 to 500 s. The ECU 111 or SCR catalyst controller 270 may estimate the duration of the anticipated ammonia spike based on nominal reductant dosing and amount of ammonia storage on the SCR catalyst surface using models, calculations, lookup tables and the like. The amount of ammonia storage can be estimated by considering such parameters as exhaust gas mass flow rate, SCR catalyst temperature, and the ammonia to NOx ratio. Feedback from temperature, NOx, and mass flow rate sensors can be used in the calculation, model, or lookup tables to estimate the amount of ammonia storage on the SCR catalyst surface to estimate the duration of the ammonia spike.

It is decided at operation 740 whether the duration of ammonia release from the SCR catalyst bed is complete. If the decision at 740 is negative, the decreased or halted reductant (urea) dosing continues and the increased NOx concentration in the exhaust gas stream to the SCR catalyst 230 continues at 750, that is, the ammonia slip reduction strategy continues. On the other hand, if the decision at 740 is positive, normal operation is resumed at 760. That is, the normal reductant dosing rate is resumed and the normal NOx concentration in the exhaust gas stream to the SCR catalyst 230 is resumed for the non-transient operating condition of the engine 100.

Figure 8:
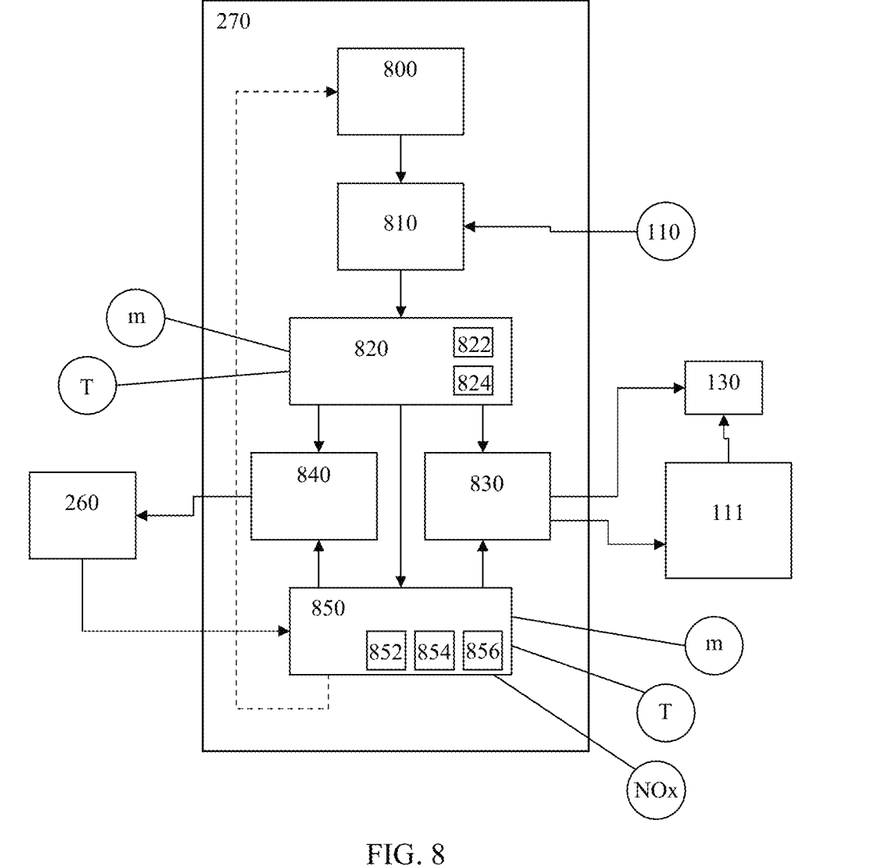
FIG. 8 is a schematic flow chart diagram of a control system configured to detect an engine operation transition, cause a NOx increase in the exhaust gas stream to the SCR catalyst, and decrease reductant to the SCR catalyst according to an exemplary embodiment.

FIG. 8 shows a schematic diagram of an exemplary embodiment of a SCR catalyst controller 270. According to exemplary embodiments of the present disclosure, the SCR catalyst controller 270 may be a separate unit or may be included in the ECU 111. The SCR catalyst controller 270 may include a normal operation module 800, an input module 810 to receive an input signal, a time delay module 820 to cause a delay of a decrease or stop of reductant dosing and increase of NOx (NOx boost or NOx pulse), an increase NOx module 830 to cause an increase of NOx, a reductant decrease or stop module 840 to cause the decrease or stop of reductant, and a time duration module 850 to signal the normal operation module 800 to resume the reductant dosing and NOx levels after a time duration when the high temperature exhaust gas transition has passed.

During non-transient engine conditions the normal operation module 800 causes normal NOx concentration levels and normal reductant dosing levels in the exhaust gas stream to the SCR catalyst 230. The normal operation module 800 may cause the control of the EGR valve 130 and the reductant control valve 260 to reduce NOx emissions using ammonia in the SCR catalyst 230.

The SCR catalyst controller 270 may include an input module 810 to receive an input signal indicating a high temperature engine operation transition event is about to occur, is occurring simultaneously with the received input signal, or has already initiated with the received input signal. The engine operation transition event is anticipated to lead to a high temperature transition event in the exhaust gas stream passing through the SCR catalyst 230. The input module 810 may receive the input signal from an input sensor 110. The input sensor 110 may detect an operator input such as pedal movement or an ECU 111 signal such as engine timing advance or delay, increasing or decreasing torque or other similar event indicative of anticipating a high temperature engine transition. The input module 810 receives the input signal before the high temperature exhaust gas stream from the high temperature engine operation transition event arrives at the SCR catalyst 230. The input module 810 determines that the high temperature engine transition event is anticipated and as a result a high temperature transition of the exhaust gas stream passing through the SCR catalyst 230 is anticipated. The input module 810 sends an anticipate high temperature exhaust transition signal to a time delay module 820.

The time delay module 820 determines the time delay until the anticipated high temperature transition engine event results in high temperature transition exhaust gas stream reaching the SCR catalyst 230. The time delay module 820 may include look up tables 822 and/or models and formulas 824 based on the engine 100 and exhaust system specifications to determine the time delay when the high temperature transition exhaust gas stream will reach the SCR catalyst 230. The time delay module 820 may also receive exhaust gas mass flow and exhaust gas temperature feedback from mass flow sensors "m" and exhaust gas temperature sensors "T".

The time delay module 820 determines a first time period when increased NOx concentration in the exhaust gas stream would reach the SCR catalyst 230 at substantially the same time as the anticipated high temperature transition in the exhaust gas stream. The time delay module 820 determines a second time period when decreased or no reductant in the exhaust gas stream would reach the SCR catalyst 230 at substantially the same time as the anticipated high temperature transition in the exhaust gas stream. The first time period and the second time period may be the same, the second time period may be greater than the first time period, or the first time period may be greater than the second time period. Generally, the increase of NOx concentration in the exhaust gas stream (NOx boost) will have further to travel along the exhaust piping system than the reductant which is typically injected near the SCR 230 inlet. Therefore, the second time period will generally be slightly greater than the first time period. The first time period may be greater than 1 millisecond, for example, about 0.05 s, about 1 s, about 2 s, about 4 s, about 6 s, about 8 s, about 10 s, about 20 s, about 30 s, about 40 s, about 50 s, about 60 s, about 70 s, about 80 s, about 90 s, about 100 s, about 200 s, or even about 300 s. The first time period may be in a range of about 0.1 s to about 200 s, about 2 s to about 100 s, about 10 s to about 75 s, or about 0.001 s to about 5 s. The second time period may be greater than about 1 millisecond, for example, greater than about 0.05 s, greater than about 1 s, for example, the second time period could be about 2 s, about 4 s, about 6 s, about 8 s, about 10 s, about 20 s, about 30 s, about 40 s, about 50 s, about 60 s, about 70 s, about 80 s, about 90 s, about 100 s, about 200 s, about 300 s, or even about 400 s. The second time period may be in a range of about 0.01 s to about 300 s, about 1 s to about 300 s, about 2 s to about 200 s, about 2 s to about 100 s, or about 10 s to about 75 s.

The time delay module 820 sends a NOx increase signal to the increase NOx module 830 at the end of the first time period. The time delay module 820 sends a reductant decrease or stop signal to the reductant decrease or stop module 840 at the end of the second time period.

Upon receiving the NOx increase signal at the end of the first time period, the increase NOx module 830 causes the EGR valve 130 to increase NOx concentration in the exhaust gas stream, for example, the increase NOx module 830 sends the necessary signal to adjust the EGR valve 130. Upon receiving the reductant decrease or stop signal at the end of the second time period, the reductant decrease or stop module 840 causes the reductant control valve 260 to decrease or stop reductant dosing, for example, the reductant decrease or stop module 840 sends the necessary signal to adjust the reductant control valve 260. According to another exemplary embodiment, the increase NOx module 830 may cause the ECU 111 to increase NOx concentration in the exhaust gas stream. The ECU 111 may cause NOx concentration to increase in the exhaust gas stream or may control the EGR valve 130 to increase NOx concentration in the exhaust gas stream.

The time duration module 850 determines whether the duration of ammonia release from the SCR catalyst bed is complete. The time duration module 850 may use lookup tables 852, models 854, calculations 856, etc. to determine whether the duration of ammonia release from the SCR catalyst bed is complete. The time duration module 850 may receive feedback on ammonia dosing history from the reductant control valve 260, exhaust gas mass flow rates from gas mass flow sensors "m", exhaust gas stream temperatures from temperature sensors "T", exhaust gas stream NOx levels and/or other engine 100 performance data from the ECU 111 or sensors to determine whether the duration of ammonia release from the SCR catalyst bed is complete. The time duration may depend on the amount of ammonia released from the SCR catalyst bed to be reacted with the increased NOx. That is, the time duration depends on the amount of ammonia to be neutralized. Upon determination that the duration of ammonia release from the SCR catalyst bed is complete, the time duration module 850 returns SCR system 220 control to the normal operation module 800. For example, FIG. 6 shows the time duration may be about 200 s to about 500 s. The time duration module 850 may determine a first time duration after which the time duration module 850 causes the increase NOx module 830 to stop the increased NOx flow to the exhaust gas stream and the SCR catalyst inlet. The time duration module 850 may determine a second time duration after which the time duration module 850 causes the reductant decrease or stop module 840 to allow normal reductant dosing delivery to resume to the exhaust gas stream and the SCR catalyst inlet. The first time duration and the second time duration may be based on whether the duration of ammonia release from the SCR catalyst bed is substantially complete or approaching completion.

The time duration module 850 may determine the first time duration based on when normal NOx concentration in the exhaust gas stream would reach the SCR catalyst 230 at substantially the same time as when the amount of ammonia released from the SCR catalyst bed has been neutralized. The time duration module 850 may determine the second time duration based on when normal reductant in the exhaust gas stream would reach the SCR catalyst 230 at substantially the same time as when the amount of ammonia released from the SCR catalyst bed has been neutralized. The first time duration and the second time duration may be the same, the second time duration may be greater than the first time duration, or the first time duration may be greater than the second time duration. Generally, the resumption of normal NOx concentration in the exhaust gas stream will have further to travel along the exhaust piping system than the reductant which is typically injected near the SCR 230 inlet. Therefore, the second time duration will generally be slightly greater than the first time duration. FIG. 4 shows an example of a first time duration of about 20 to 100 s and a second time duration of about 70 to 100 s. However, the first time duration and the second time duration are not limited to these values. For example, the first time duration may be greater than 1 second, for example, greater than about 5 s, about 10 s, about 20 s, about 40 s, about 60 s, about 80 s, about 100 s, about 200 s, about 300 s, about 400 s, or even greater than about 500 s. The first time duration may be in a range of about 10 s to about 200 s, about 20 s to about 100 s, about 40 s to about 90 s, or about 50 s to about 80 s. The second time duration may be greater than about 1 second, for example, greater than about 5 s, greater than about 10 s, for example, the second time duration could be about 2 s, about 4 s, about 6 s, about 8 s, about 10 s, about 20 s, about 30 s, about 40 s, about 50 s, about 60 s, about 70 s, about 80 s, about 90 s, about 100 s, about 200 s, about 300 s, or even about 400 s. The second time duration may be in a range of about 1 s to about 300 s, about 10 s to about 250 s, about 20 s to about 200 s, about 30 s to about 100 s, or about 40 s to about 80 s.

The normal operation module 800 resumes normal reductant dosing and normal exhaust gas stream NOx levels for the non-transition operating conditions of the engine 100. For example, the SCR catalyst bed may readsorb ammonia during normal engine 100 conditions.

Thus, exemplary embodiments of the disclosure prevent ammonia spikes in the tailpipe of SCR equipped vehicles and as a result would make the vehicle in ammonia compliance with regulations in areas where ammonia is regulated.

Exemplary embodiments of the disclosure also improve reductant consumption and optimize the reductant control strategy by consuming otherwise wasted ammonia on the SCR catalyst.

Exemplary embodiments of the disclosure also directly reduce fuel consumption and increase power output as a result of the steps undertaken to increase NOx concentration in the exhaust gas stream during the period of expected ammonia desorption so that the NOx can react with the desorbed ammonia.

Exemplary embodiments of the disclosure use brief high NOx pulses as a way of avoiding ammonia slip and this may also help burn soot in an upstream diesel particulate matter (PM) filter every time the high NOx pulses are employed.

Exemplary embodiments of the disclosure also allow the high NOx pulse to react with the released ammonia and as a result there is not a significant penalty on the tailpipe NOx and the overall NOx conversion efficiency is not affected.

Thus, by utilization of the exemplary embodiments of the disclosure, ammonia oxidation (AMOX) catalysts may be downsized or completely eliminated.

Some of the functional units described in this specification have been labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. A module may also be implemented with valves, pistons, gears, connecting members, and springs, or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to exemplary embodiments and similar language throughout this specification may, but do not necessarily, refer to the same embodiment. Furthermore, the described features, structures, or characteristics of the subject matter described herein with reference to an exemplary embodiment may be combined in any suitable manner in one or more exemplary embodiments. In the description, numerous specific details are provided, such as examples of controls, structures, algorithms, programming, software modules, user selections, network transactions, database queries, database structures, hardware modules, hardware circuits, hardware chips, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

The schematic flow chart diagrams and method schematic diagrams described above are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method to control ammonia slip in a selective catalytic reduction (SCR) system, the method comprising:
    detecting, using a controller, an engine operation transition event comprising a high temperature event that causes an increase in a temperature of an engine exhaust gas stream;
    determining, using a time delay module comprising at least one hardware circuit included in the SCR system, a time delay from detecting the engine operation transition event to a time when the engine exhaust gas stream at increased temperature reaches the SCR system;
    increasing, using an internal combustion engine, NOx concentration in the engine exhaust gas stream based on the time delay; and
    decreasing, using a reductant control valve, a reductant dose to the exhaust gas stream based on the time delay.

2. The method of claim 1, wherein the high temperature event comprises at least one of an increased fuel flow, a change in fuel delivery pressure to the internal combustion engine, an engine fuel injection timing change, a change in engine rotations per minute (rpm), and a change in engine torque.

3. The method of claim 1, wherein detecting the engine operation transition event comprises receiving a signal indicating at least one of an increased fuel flow, a change in fuel delivery pressure to the internal combustion engine, an engine fuel injection timing change, a change in engine rotations per minute (rpm), and a change in engine torque.

4. The method of claim 1, wherein increasing the NOx concentration comprises adjusting exhaust gas recirculation in the internal combustion engine.

5. The method of claim 1, wherein increasing the NOx concentration comprises adjusting fuel injection timing.

6. The method of claim 1, further comprising:
    determining a first time period after detecting the engine operation transition event, the first time period indicating when to start increasing the NOx concentration such that the increased NOx concentration reaches the selective catalytic reduction (SCR) system at substantially the same time as the engine exhaust gas stream at the increased temperature,
    wherein increasing the NOx concentration in the engine exhaust gas stream comprises delaying increasing the NOx concentration until the first time period has elapsed; and
    determining a second time period after detecting the engine operation transition event, the second time period indicating when to start decreasing the reductant dose such that the decreased reductant dose reaches the selective catalytic reduction (SCR) system at substantially the same time as the engine exhaust gas stream at increased temperature,
    wherein decreasing the reductant dose comprises delaying decreasing the reductant dose until the second time period has elapsed.

7. The method of claim 6, wherein
    the first time period is greater than about 1 second; and
    the second time period is greater than about 1 second.

8. The method of claim 6, wherein the second time period is greater than the first time period.

9. The method of claim 1, further comprising:
    returning the NOx concentration in the engine exhaust gas stream to a regular engine operating level; and
    resuming the reductant dose to the SCR catalyst at a regular dose level.

10. The method of claim 9, wherein resuming reductant dose to the SCR catalyst at the regular dose level comprises injecting sufficient reductant to cause ammonia adsorption on the SCR catalyst.

11. The method of claim 9, wherein
    returning the NOx concentration in the engine exhaust gas stream to the regular engine operating level comprises delaying returning the NOx concentration to the regular engine operating level until a first time duration after increasing the NOx concentration has elapsed; and
    resuming the reductant dose to the SCR catalyst at the regular dose level comprises delaying resuming the reductant dose until a second time duration after decreasing the reductant dose has elapsed.

12. The method of claim 11, wherein
    the first time duration is greater than about 1 second; and
    the second time duration is greater than about 1 second.

13. The method of claim 11, further comprising:
    determining the first time duration based on a time when the NOx concentration at the regular engine operating level in the exhaust gas stream reaches the SCR catalyst and a time when an amount of ammonia released from the SCR catalyst has been neutralized.

14. The method of claim 11, further comprising:
    determining the second time duration based on a time when the resumed reductant dose reaches the SCR catalyst and a time when an amount of ammonia released from the SCR catalyst has been neutralized.

15. An apparatus configured to control a selective catalytic reduction (SCR) system of an internal combustion engine system, comprising:
    a controller comprising at least one hardware circuit, the controller configured to:

detect an engine operation transition event comprising a high temperature event that causes an increase in a temperature of an engine exhaust gas stream; and generate an engine transition signal based on the detection;

a time delay module comprising at least one hardware circuit, the time delay module configured to determine a time delay from detecting the engine operation transition event to a time when the engine exhaust gas stream at increased temperature reaches the selective catalytic reduction (SCR) system;

a NOx increase module comprising at least one hardware circuit, the NOx increase module configured to cause a NOx concentration increase in the engine exhaust gas stream based on the time delay;

a reductant control module comprising at least one hardware circuit, the reductant control module configured to cause a reductant dose decrease in the engine exhaust gas stream based on the time delay; and a reductant control valve coupled with the reductant control module and configured to reduce the reductant dose in the engine exhaust as stream.

16. The apparatus of claim 15, wherein the high temperature event comprises one of an increased fuel flow to the engine, an injection timing advance, an increase in engine rotations per minute (rpm), and an increase in engine torque.

17. The apparatus of claim 15, wherein the NOx increase module is configured to cause adjustment of at least one of an exhaust gas recirculation (EGR) valve, an engine fuel injection timing, intake air pressure, and fuel delivery pressure to an engine.

18. The apparatus of claim 15, wherein the NOx increase module is configured to delay causing the NOx concentration increase until a first time period after detecting the engine operation transition event has elapsed; and the reductant control module is configured to delay causing a reductant dose decrease until a second time period after detecting the engine operation transition event has elapsed.

19. The apparatus of claim 15, wherein the NOx increase module is configured to cause a return of a NOx level to a regular engine operating level after a first time duration; and the reductant control module is configured to cause a resumption of a reductant dose to a regular dose level after a second time duration.

20. An engine system comprising:

an internal combustion engine configured to produce an exhaust gas stream;

a selective catalytic reduction (SCR) catalyst configured to receive the exhaust gas stream and reduce NOx emissions in the exhaust gas stream in the presence of a reductant;

an engine control unit comprising at least one hardware circuit, the engine control unit configured to detect an engine operation transition event that causes an increase in a temperature of the exhaust gas stream and to generate an engine transition signal based on the detection;

an SCR system controller comprising at least one hardware circuit, the SCR system configured to:

receive the engine transition signal;

determine a time delay from after receiving the engine transition signal to a time when the exhaust gas stream reaches the SCR catalyst; and cause a NOx increase in the exhaust gas stream and a decrease of reductant dose to the SCR catalyst based on the time delay.

* * * * *